US007079112B1

(12) United States Patent
Liebenow

(10) Patent No.: US 7,079,112 B1
(45) Date of Patent: Jul. 18, 2006

(54) POINTING DEVICE WITH ABSOLUTE AND RELATIVE POSITIONING CAPABILITY

(75) Inventor: Frank W. Liebenow, Dakota Dunes, SD (US)

(73) Assignee: Gateway Inc., Irvine, CA (US)

( * ) Notice: Subject to any disclaimer, the term of this patent is extended or adjusted under 35 U.S.C. 154(b) by 0 days.

(21) Appl. No.: 09/491,110

(22) Filed: Jan. 25, 2000

Related U.S. Application Data

(63) Continuation of application No. 08/890,186, filed on Jul. 9, 1997, now Pat. No. 6,078,312.

(51) Int. Cl.
G09G 5/08 (2006.01)

(52) U.S. Cl. ........................ 345/158; 345/161; 345/166

(58) Field of Classification Search ................ 345/161, 345/163, 166, 164, 158
See application file for complete search history.

(56) References Cited

U.S. PATENT DOCUMENTS

| 3,631,462 | A | 12/1971 | Dym ........................... 340/347 |
| 4,206,314 | A | 6/1980 | Prugh et al. ................... 178/19 |
| 4,390,873 | A | 6/1983 | Kirsch ......................... 340/710 |
| 4,484,016 | A | 11/1984 | Maschmeyer et al. ........ 178/18 |
| 4,484,026 | A | 11/1984 | Thornburg ................... 178/18 |
| 4,514,726 | A | 4/1985 | Whetstone et al. ......... 340/710 |
| 4,521,772 | A * | 6/1985 | Lyon ........................... 345/166 |
| 4,543,571 | A * | 9/1985 | Bilbrey et al. .............. 345/166 |
| 4,546,347 | A | 10/1985 | Kirsch ......................... 340/710 |
| 4,552,360 | A | 11/1985 | Bromley et al. .......... 273/85 G |
| 4,647,771 | A | 3/1987 | Kato ........................ 250/237 R |
| 4,686,329 | A * | 8/1987 | Joyce ............................. 178/1 |
| 4,698,626 | A | 10/1987 | Sato et al. .................... 340/710 |
| 4,751,380 | A | 6/1988 | Victor et al. ................. 250/221 |
| 4,799,055 | A | 1/1989 | Nestler et al. ............... 340/710 |
| 4,834,502 | A | 5/1989 | Bristol et al. ................ 350/322 |
| 4,857,903 | A | 8/1989 | Zalenski ...................... 340/710 |
| 4,870,389 | A | 9/1989 | Ishiwata et al. ............. 340/709 |
| 4,880,967 | A * | 11/1989 | Kwang-Chien ............. 250/221 |
| 4,920,260 | A | 4/1990 | Victor et al. ................. 250/221 |
| 4,931,781 | A | 6/1990 | Miyakawa ................... 340/706 |

(Continued)

FOREIGN PATENT DOCUMENTS

DE 29615333 10/1996

(Continued)

OTHER PUBLICATIONS

Hildreth, S., "Discuit: V1.4 Compact Disc Player", America Online; File:DISC104.ZIP, Apr. 18, 1996, 1 page, (Nov. 29, 1995).

(Continued)

Primary Examiner—Guy Lamarre
Assistant Examiner—Fritz Alphonse
(74) Attorney, Agent, or Firm—Jeffrey A. Proehl; Woods Fuller Shultz & Smith

(57) ABSTRACT

A pointing device of a computer having absolute and relative positioning capability is disclosed. In a mouse pointing device embodiment, the mouse is movable over a mouse pad having a surface having a plurality of uniquely coded positions. The mouse includes a mechanism to detect the position over which it has been moved, and conveys this information to the computer to which it is coupled. Specifically, the surface having a plurality of uniquely coded positions in one embodiment is a two-color gradient in which each color goes from maximum to minimum intensity level over an axis perpendicular to that of the other. The mechanism includes sensors to detect the intensity levels of the colors. In another embodiment, a joystick pointing device having absolute and relative positioning capability is disclosed.

24 Claims, 7 Drawing Sheets

U.S. PATENT DOCUMENTS

| | | | |
|---|---|---|---|
| 4,937,778 A | 6/1990 | Wolf et al. | 364/900 |
| 4,994,795 A | 2/1991 | MacKenzie | 340/710 |
| 5,038,279 A | 8/1991 | Bertram et al. | 364/200 |
| 5,056,057 A | 10/1991 | Johnson et al. | 364/900 |
| 5,117,102 A | 5/1992 | Mitchell | 250/229 |
| 5,173,940 A | 12/1992 | Lantz et al. | 380/25 |
| 5,186,629 A | 2/1993 | Rohen | 434/114 |
| 5,197,147 A | 3/1993 | Long et al. | 395/500 |
| 5,214,421 A | 5/1993 | Vernon et al. | 340/825.03 |
| 5,223,709 A | 6/1993 | Pettypiece, Jr. | 250/229 |
| 5,245,321 A | 9/1993 | Franz et al. | 345/172 |
| 5,305,449 A | 4/1994 | Ulenas | 395/500 |
| 5,327,161 A | 7/1994 | Logan et al. | 345/157 |
| 5,331,337 A | 7/1994 | Kabeya et al. | 345/172 |
| 5,339,095 A | 8/1994 | Redford | 345/158 |
| 5,349,371 A | 9/1994 | Fong | 345/166 |
| 5,365,026 A | 11/1994 | Cromer, Jr. et al. | 200/1 R |
| 5,369,771 A | 11/1994 | Gettel | 395/750 |
| 5,379,053 A | 1/1995 | Steinberg | 345/157 |
| 5,392,386 A | 2/1995 | Chalas | 395/155 |
| 5,402,518 A | 3/1995 | Lowery | 395/2.1 |
| 5,404,321 A | 4/1995 | Mattox | 364/709.01 |
| 5,420,943 A | 5/1995 | Mak | 382/313 |
| 5,463,387 A | 10/1995 | Kato | 341/31 |
| 5,508,717 A | 4/1996 | Miller | 345/145 |
| 5,517,211 A | 5/1996 | Kwang-Chien | 345/166 |
| 5,550,562 A | 8/1996 | Aoki et al. | 345/163 |
| 5,563,628 A | 10/1996 | Stroop | 345/156 |
| 5,586,324 A | 12/1996 | Sato et al. | 395/652 |
| 5,608,895 A | 3/1997 | Lee | 395/500 |
| 5,623,261 A | 4/1997 | Rose | 341/26 |
| 5,636,211 A | 6/1997 | Newlin et al. | 370/465 |
| 5,648,781 A | 7/1997 | Choi | 341/176 |
| 5,648,798 A | 7/1997 | Hamling | 345/163 |
| 6,188,387 B1 | 2/2001 | Hall | 345/157 |
| 6,208,384 B1 | 3/2001 | Schultheiss | 348/552 |
| 6,292,181 B1 | 9/2001 | Banerjee et al. | 345/179 |

FOREIGN PATENT DOCUMENTS

| | | |
|---|---|---|
| EP | 0 596 594 | 5/1994 |
| EP | 0602947 | 6/1994 |
| WO | 96/06486 | 2/1996 |

OTHER PUBLICATIONS

Knize, R., "SUPERCD: Super CD v2.5 Music CD Player", America Online; File DUPRCD@$.ZIP, Apr. 18, 1996, 2 pages, (Feb. 17, 1996).

Messmer, H., "The Indispensable PC Hardware Book—Your Hardware Questions Answered", Second Edition, Addison-Wesley Publishing Company, 919-53, (1995).

Moon, C.G., "PROCD: V5.05 CD Music Player", America Online; File: PROCD505.EXE, Apr. 18, 1996, 2 pages, (Jun. 22, 1994).

"Mouse Systems MS Optical Technology", Mouse Systems—Optical Technology product information, http://www.mousesystems.com/optech.htm, 1 page, (Feb. 29, 1996).

"Mouse with Ears", Reproduced from RESEARCH DISCLOSURE, No. 332, Kenneth Mason Publications Ltd, England, 1 page, (Dec. 1991).

"Multimedia: Panasonic introduces multimedia notebook PC with Pentium 90 MHz CPU", *EDGE: Work-Group Computer Report*, vol. 6; No. 270; p. 21, EDGE Publishing, 5 pages, (Jul. 24, 1995).

"Panasonic notebook has internal CD-ROM drive", *Newsbyte News Network*, 2 pages, (Sep. 21, 1994).

"The Indispensible PC Hardware Book".

"Toshiba delivers first mobile Pentium notebook computer", *Business Wire: Section 1, p. 1*, 4 pages, (Oct. 10, 1994).

Duncan, R., "An Examination of DevHlp API; writing OS-2 bimodal device drivers", *Microsoft Systems Journal*, vol. 3, No. 2, p. 39, 11 pages, (Mar. 1988).

\* cited by examiner

POINTING DEVICE WITH ABSOLUTE AND RELATIVE POSITIONING CAPABILITY

This application is a continuation of U.S. Ser. No. 08/890,186, filed Jul. 9, 1997 now U.S. Pat. No. 6,078,312.

FIELD OF THE INVENTION

This invention relates generally to pointing devices for computers, and more particularly to such pointing devices that have absolute and relative positioning capability.

BACKGROUND OF THE INVENTION

With the advent of graphical user interfaces, the utilization of pointing devices with computers has become commonplace. Most computers today include a pointing device. The pointing device permits a user of the computer to control the movement of a pointer on the screen of the computer. Having the ability to control the pointer is necessary for activities such as selecting a window on the screen, highlighting text in a word processing program, etc. Typical pointing devices include a mouse, a touch pad, a joy stick, a wheel, and a trackball.

However, pointing devices are usually relative positioning devices. This means that the actual physical position of a mouse pointing device on a mouse pad, for example, has no bearing on the location of the pointer on the screen. The mouse instead transmits directional change information. A user moving the mouse a given distance to the right causes the computer to move the pointer on the screen a corresponding distance to the right. That the user moved the mouse from the left side of the mouse pad to the center of the mouse pad, for example, is no different than if the user had moved the mouse from the center of the mouse pad to the right side of the mouse pad.

This type of mouse pointing device is inherently a relative positioning device. In the case where the mouse pointing device is a mechanical mouse, the mouse includes two wheels which sense the relative change in position of the mouse along each of two axes. These wheels are incapable of detecting the absolute position of the mouse. In the case where the mouse is an optical mouse, the mouse includes an optical sensor that detects the number of lines of a grid over which the mouse has been moved, in each of two perpendicular directions. The optical sensor is also incapable of detecting absolute position of the mouse.

As a further example, joystick pointing devices are also typically relative positioning devices. When the control stick of a joystick is in its center position, this does not mean that the pointer on the screen of a computer is located in the center of the screen, but rather that the pointer is not moving on the screen. That is, the location of the control stick within its range of motion has no bearing on the location of the pointer on the screen. A user pushing the control stick to the left causes the computer to move the pointer on the screen a corresponding distance to the left. When the user lets up on the control stick the pointer stops to where it has last moved, and does not return to the center of the screen.

This type of joystick is also inherently a relative positioning device. In the case of one common type of joystick, pushing the control stick of the joystick in any of eight directions causes an electrical connection to be made on one of eight terminals evenly spaced around the control stick. This electrical connection is signaled to the computer to which the joystick is coupled; by identifying which terminal at which the electrical connection has been made, the computer is able to identify the direction in which the stick has been pushed. These terminals render the joystick incapable of detecting absolute position of the control stick within its range of motion.

Therefore, there is a need for a pointing device that has absolute positioning capability. Such a mouse pointing device should signal the computer to which it is coupled the location of the mouse on a mouse pad. Such a joystick pointing device should signal the computer to which it is coupled the location of the control stick of the joystick within its range of motion.

SUMMARY OF THE INVENTION

The above-mentioned shortcomings of pointing devices having relative positioning capability are addressed by the present invention, which will be understood by reading and studying the following specification. The present invention describes a pointing device having an absolute and relative positioning capability. In one embodiment, the pointing device includes one or more sensors and corresponding gradients, each having a plurality of positions uniquely varying in intensity level.

In the case of a mouse pointing device, the gradients are transposed over each other on a surface such as a mouse pad, such that the gradients decrease in intensity level along perpendicular axes. Thus, movement of the mouse in any direction permits detection of the exact position of the mouse on the surface. One sensor detects the position of the mouse along one of the axes, and the other sensor detects the position of the mouse along the other axis. Therefore, the sensors together are able to determine the absolute position of the mouse over the mouse pad. Alternatively, the sensors are still able to determine the relative position of the mouse by determining the difference in intensity level of each gradient when the mouse is moved from one position to another.

In the case of a joystick pointing device, in one embodiment the gradients are on separate surfaces, but are aligned with each other such that the gradients decrease in intensity level along perpendicular axes. The surfaces are positioned such that movement of the control stick of the joystick causes corresponding positioning of the sensors vis-a-vis the gradients. Thus, movement of the control stick in any direction permits detection of the exact position of the control stick within its range of motion. One sensor detects the position of the control stick along one of the axes, and the other sensor detects its position along the other axis. Like the sensors of the mouse pointing device, the sensors of the joystick pointing device are also able to determine both the absolute and relative positioning of the joystick.

Still other and further aspects, advantages and embodiments of the present invention will become apparent by reference to the drawings and by reading the following description.

DETAILED DESCRIPTION OF THE INVENTION

In the following detailed description of the preferred embodiments, reference is made to the accompanying drawings which form a part hereof, and in which is shown by way of illustration specific preferred embodiments in which the inventions may be practiced. These embodiments are described in sufficient detail to enable those skilled in the art to practice the invention, and it is to be understood that other embodiments may be utilized and that logical, mechanical and electrical changes may be made without departing from the spirit and scope of the present invention. The following detailed description is, therefore, not to be taken in a limiting sense, and the scope of the present inventions is defined only by the appended claims.

Figure 1A:
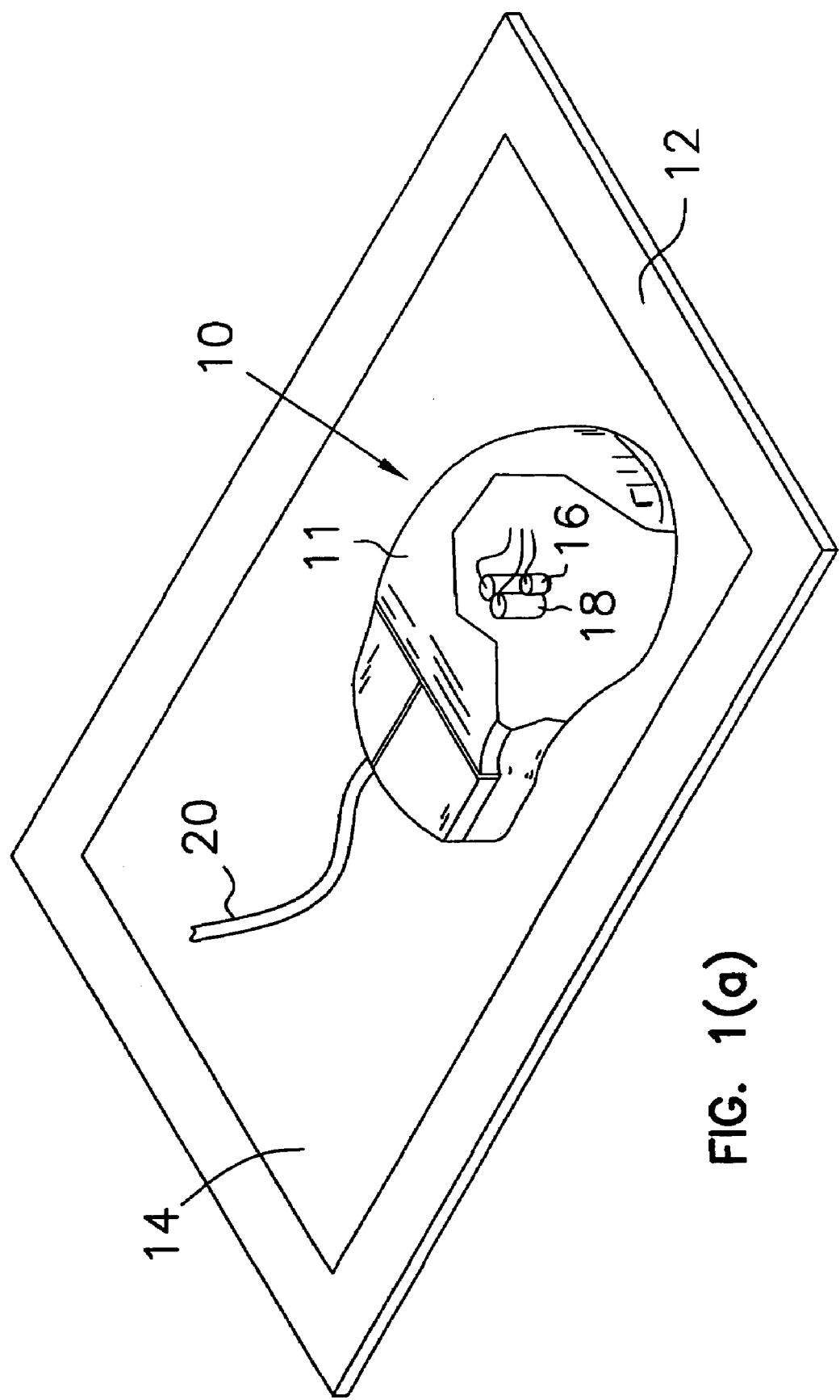
FIG. 1(a) is a diagram of a mouse pointing device according to one embodiment of the invention.

Referring first to FIG. 1(a), a diagram of a mouse pointing device according to one embodiment of the invention is shown. Mouse pointing device 10 includes housing 11 and moves freely on mouse pad 12 having gradient 14. The gradient is one type of surface that has a plurality of uniquely coded positions. As mouse pointing device 10 is moved (for example, by a user of a computer to which mouse pointing device 10 is coupled), illuminated lens 16 disposed on the underside of housing 11 illuminates the uniquely coded position underneath sensors 18, which are also disposed on the underside of housing 11. Sensors 18 detect the uniquely coded position, which is then conveyed via cable 20 to a computer or other device (not shown in FIG. 1(a)). As shown in FIG. 1(a), housing 11 is partially broken away to reveal illuminated lens 16 and sensors 18. This is for purposes of clarity only; preferably lens 16 and sensors 18 cannot be seen from the top view of mouse 10 having a housing 11 not broken away.

Sensors 18 are a mechanism by which mouse pointing device 10 detects its position on mouse pad 12, making mouse pointing device 10 a pointing device with absolute and relative positioning capability. Because each area of mouse pad 12 has a different uniquely coded position, mouse pointing device 10 is able to determine the location at which it is positioned, within the density of the number of uniquely coded positions on gradient 14. The greater the number of uniquely coded positions on gradient 14, the greater accuracy at which the mouse pointing device 10 is able to pinpoint its position on mouse pad 12.

The invention is not limited to any particular mechanism used to detect the uniquely coded positions on gradient 14. Sensors 18 are one type of mechanism, and are preferably optical sensors. Such optical sensors, along with illuminated lens 16 to illuminate the region underneath the sensors to permit them to detect the uniquely coded positions, are well known to those of ordinary skill within the art, and are typically photo diodes. Furthermore, illuminated lens 16 is one type of light source, and is preferably a light-emitting diode (LED), although the invention is not so limited. Optical mouse pointing devices having only relative positioning capability, such as those referenced on the Internet web page http://www.mousesystems.com/optech.thm, which is hereby incorporated by reference, are one example of devices that incorporate such lenses and sensors.

Figure 1B:
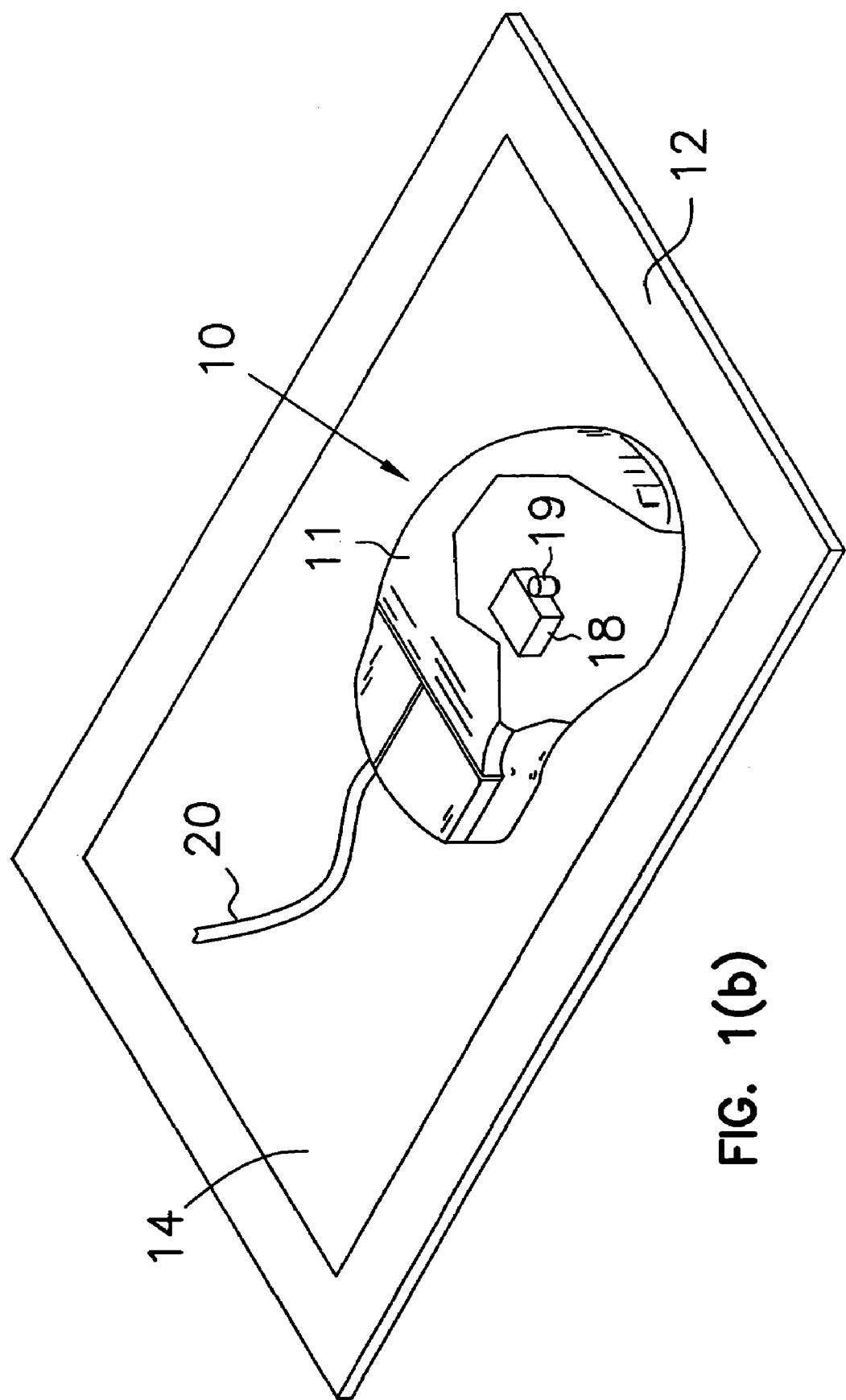
FIG. 1(b) is a diagram of a mouse pointing device according to another embodiment of the invention.

Referring to FIG. 1(b), a diagram of a mouse pointing device according to another embodiment of the invention is shown. The mouse pointing device of shown in FIG. 1(b) is identical to that of FIG. 1(a), except that it has a single sensor 19, as opposed to the two sensors 18 as shown in FIG. 1(a). That is, mouse pointing device 10 includes housing 11 and moves freely on mouse pad 12 having gradient 14. Illuminated lens 16 disposed on the underside of housing 11 illuminates the uniquely coded position underneath the single sensor 19. Sensor 19, like sensors 18 of FIG. 1(a), detects the uniquely coded position, and conveys this information via cable 20 to a computer or other device not shown in FIG. 1(b). Sensor 19 is preferably an optical sensor, such as a CCD sensor, as known within the art. Furthermore, as shown in FIG. 1(b), housing 111 is partially broken away to reveal illuminated lens 16 and sensor 19. This is for purposes of clarity only; preferably lens 16 and sensor 19 cannot be seen from the top view of mouse 10 having a housing 11 not broken away.

Figure 2:
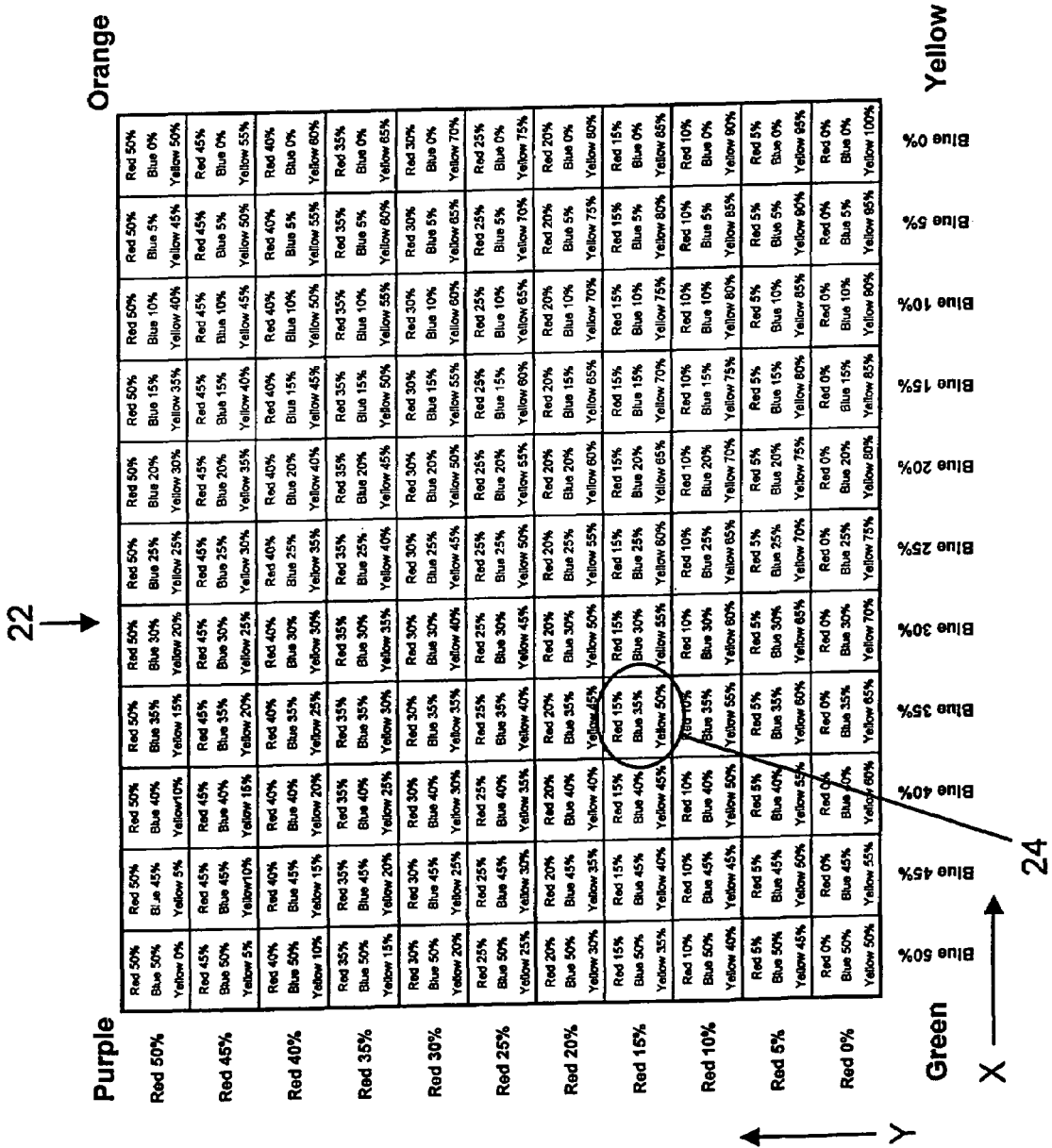
FIG. 2 is a diagram illustrating one embodiment of the gradient of FIG. 1(a) and of FIG. 1(b) in more detail.

Referring next to FIG. 2, a diagram illustrating one embodiment of the gradient of FIG. 1(a) and of FIG. 1(b) in more detail is shown. Gradient 22 has a number of uniquely coded positions 24. Each uniquely coded position 24 is made up of a percentage of the color red, and a percentage of the color blue. The remaining percentage of each uniquely coded position 24 is made up of a percentage of the color yellow.

As indicated by the X axis, the color blue makes up fifty percent of each uniquely coded position on the left side of gradient 22, which then gradually fades to zero percent blue along the X axis towards the right side of gradient 22. Similarly, as indicated by the y axis, the color red makes up fifty percent of each uniquely coded position on the top side of gradient 22, which then gradually fades to zero percent red along the Y axis towards the bottom side of gradient 22. Gradient 22 is thus comprised of two separate gradients: a blue gradient fading from maximum intensity to minimum intensity over the x axis, transposed over a red gradient fading from maximum intensity to minimum intensity over the y axis.

When the mouse pointing device of FIG. 1(a) is positioned over any uniquely coded position 24, one sensor 18, having a blue filter, reads the intensity level of the color blue of position 24, while the other sensor 18, having a red filter, reads the intensity level of the color red of position 24. When the mouse pointing device of FIG. 1(b) is positioned over any uniquely coded position 24, the single sensor 19 (such as a CCD sensor), without having any filters, is able to read the intensity level of each of the colors red and blue of position 24.

Because each position 24 has a unique combination of blue and red, each position 24 is uniquely coded. By reading the level of red and blue in a given position, the mouse pointing device is able to determine its exact location on the mouse pad. That is, the mouse pointing device is absolutely positionable. Note that because the difference in intensity level of both gradients between two different positions of the mouse pointing device is also determinable, the mouse pointing device is also a relatively positionable pointing device as well. That is, comparing the absolute position of mouse at an initial position with the absolute position of the mouse at a subsequent position is able to yield the direction and distance that the mouse has been moved (i.e., the relative position of the mouse). The percentage of yellow is not read by the sensors 18 or the sensor 19, and is used for shading purposes—i.e., to replace the color red or blue as that color decreases in intensity level. Yellow is the preferred color for shading purposes, although any color is utilizable so long as it does not interfere with the sensor's or sensors' ability to detect the colors red and blue.

As shown in FIG. 2, the level of blue decreases from fifty percent intensity to zero percent intensity in five percent increments, as does the level of red. To increase accuracy, a finer density of gradient can be used. For example, a gradient in which the levels of both red and blue decrease in one percent increments provides a greater accuracy in determining the exact location of the mouse pointing device than does a gradient in which the levels decrease in five percent increments. Any density of gradient is within the scope of the present invention.

Figure 3:
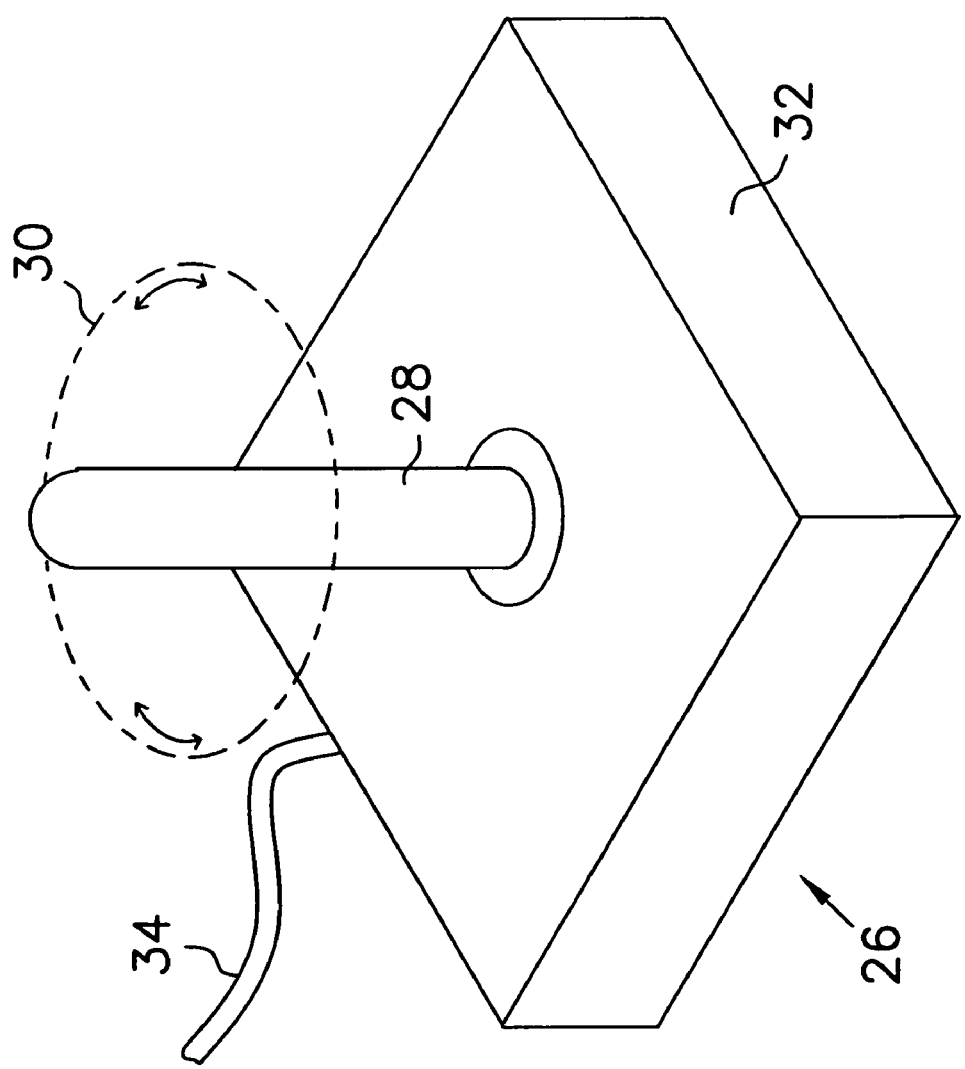
FIG. 3 is a diagram of a joystick pointing device according to one embodiment of the invention.

Referring now to FIG. 3, a diagram of a joystick pointing device according to one embodiment of the invention is shown. Joystick pointing device 26 includes control stick 28 disposed within housing 32. As indicated by arrows, control stick 28 can be moved within a range of motion 30. Joystick pointing device 26 is an absolute and relative positioning device in that it conveys via cable 34 to a computer or other device (not shown in FIG. 3) the position of control stick 28 within range of motion 30. Joystick pointing device 26 detects the position of control stick 28 within range of motion 30 via detection of one of a plurality of uniquely coded positions for each of at least one surface, and conveyance of the position to the computer or other device attached to cable 34.

Figure 4:
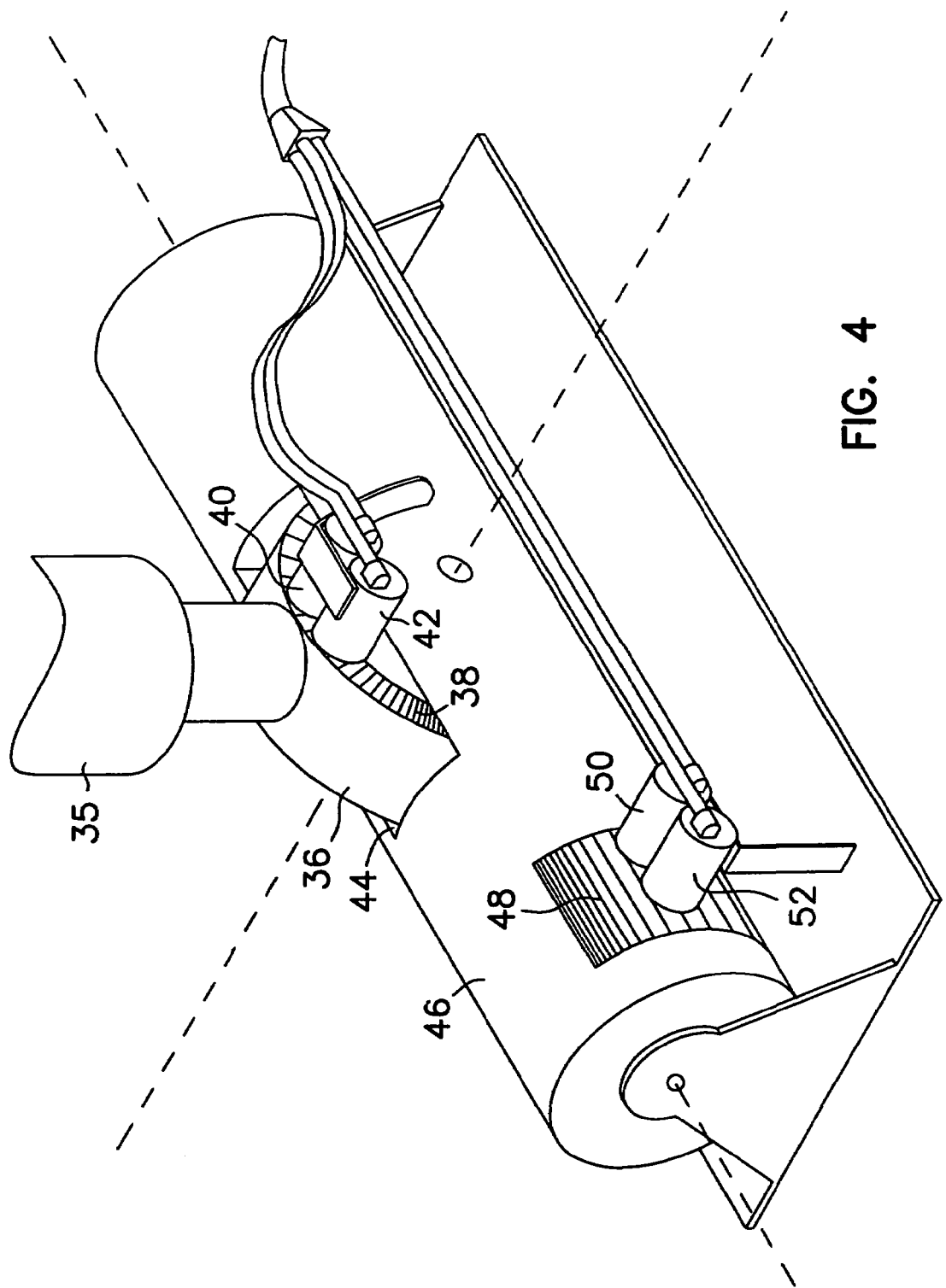
FIG. 4 is a diagram illustrating one manner by which the joystick pointing device of FIG. 3 is implemented.

One embodiment showing the manner by which the joystick of FIG. 3 is implemented is shown in FIG. 4. Control stick 35 has attached to its bottom end wheel 36, which is rotatable along an X axis. On one side surface of wheel 36 is gradient 38, which is one type of surface that has a plurality of uniquely coded positions. Gradient 38 is preferably a gradient of a single color, going from maximum intensity of one-hundred percent of the color at one end of the range of motion of the wheel to minimum intensity of zero-percent at the other end of the range of motion of the wheel, as the wheel is rotated along the x axis. In another embodiment, gradient 38 is a gray-scale gradient, such that one end of the wheel is black (maximum intensity) and goes to white (minimum intensity) at the other end of the wheel as the wheel is rotated along the x axis. The gradient is one type of surface that has a plurality of uniquely coded positions; the invention is not limited to any particular kind of surface.

As wheel 36 is rotated along the x axis by movement of stick 36 along that axis, a position along gradient 38 of wheel 36 underneath sensor 40 is illuminated by illuminated lens 42. Sensor 40 senses the intensity of gradient 38 at the position underneath sensor 40, which is uniquely coded. That is, sensor 40 measures the percentage of color at the position. Because each position at which stick 35 is movable along the X axis corresponds to a different uniquely coded position along gradient 38, within the density of gradient 38, this means that sensor 40 is able to determine the absolute position of stick 35 along the x axis. Sensor 40 and illuminated lens 42 are fixed such that they do not move in conjunction with any movement of stick 35 within its range of motion.

Wheel 36 rotates along the X axis within slot 44 of roller 46. Slot 44 is constructed such that movement of stick 35 along the y axis (i.e., the axis perpendicular to the axis along which wheel 36 rotates) causes roller 46 to rotate along the y axis. On part of the cylindrical surface of roller 46 is gradient 48, which is one type of surface that has a plurality of uniquely coded positions. Gradient 48 is also preferably a gradient of a single color, going from maximum intensity of one-hundred percent of the color at one end of the range of motion of the roller, to minimum intensity of zero-percent at the other end of the range of motion of the roller. In another embodiment, gradient 38 is a gray-scale gradient, going from black (maximum intensity) to white (minimum intensity) as the roller goes through its range of motion along the y axis. The gradient is one type of surface that has a plurality of uniquely coded positions; the invention is not limited to any particular kind of surface.

As roller 46 is rotated along the y axis by movement along that axis of stick 35, a position along gradient 48 of roller 46 underneath sensor 50 is illuminated by illuminated lens 52. Sensor 50 senses the intensity of gradient 48 at the position underneath sensor 50, which is uniquely coded. That is, sensor 50 measures the percentage of color at the position. Because each position at which stick 35 is movable along the Y axis corresponds to a different uniquely coded position along gradient 48, within the density of gradient 48, this means that sensor 50 is able to determine the absolute position of stick 35 along the y axis. Sensor 50 and illuminated lens 52 are fixed such that they do not move in conjunction with any movement of control stick 35 within its range of motion.

In this manner the joystick having control stick 35 is absolutely positionable. At each point within the control stick's range of motion, there is a unique combination of a uniquely coded position of gradient 38 (corresponding to the position of the stick along the x axis), and a uniquely coded position of gradient 40 (corresponding to the position of the stick along the y axis). Therefore, the joystick is able to determine the position of control stick 35 at each point within its range of motion. Because the absolute position of the control stick is determinable at any two different positions, the joystick is also a relatively positionable device. That is, comparing the absolute position of the control stick at an initial position with the absolute position of the control stick at a subsequent position is able to yield the direction and distance that the control stick has been moved (i.e., the relative position of the control stick).

The invention is not limited to any particular sensors 40 and 50. However, similar to the sensors of the mouse pointing device of FIG. 1(*a*) described above, preferably sensors 40 and 50 are optical sensors, such as photo diodes. Each sensor preferably includes a color filter matching the color of the gradient the sensor is meant to detect. Similarly, the invention is not limited to any particular illuminated lenses 42 and 52. Again, however, similar to the illuminated lens of the mouse pointing device described above, preferably illuminated lens 42 and 52 are light-emitting diodes (LEDs), which are one type of light source.

Gradients 38 and 48 of FIG. 4 are also similar to the gradient of the mouse pad described above in conjunction with the mouse pointing device. However, whereas the gradient of the mouse pad is constructed by the transposition of two separate one-color gradients, each of gradient 38 and gradient 48 is a one-color gradient not transposed over one another. Gradient 38 and gradient 48, therefore, may be thought of as the separation of the individual one-color gradients from the two-color gradient of the mouse pad described above. The density of each gradient—i.e., the number of uniquely coded positions within a gradient— determines the accuracy at which the joystick is able to determine the position of the control stick within its range of motion.

Figure 5:
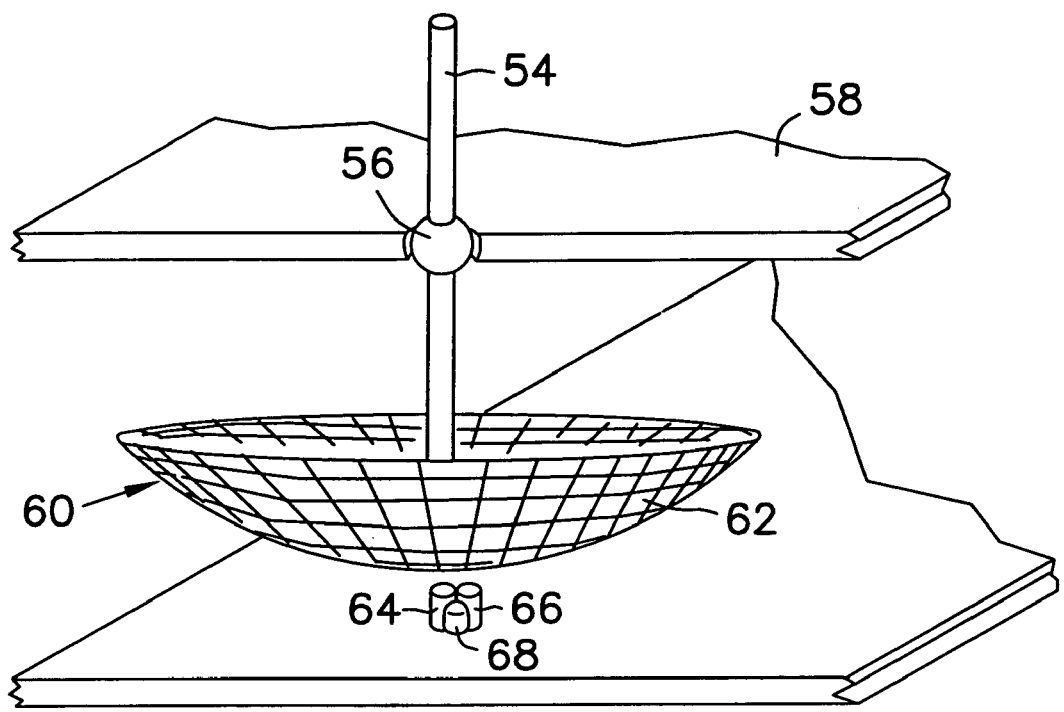
FIG. 5 is a diagram illustrating another manner by which the joystick pointing device of FIG. 3 is implemented.

Referring now to FIG. 5, a diagram illustrating another manner by which a joystick pointing device having absolute and relative positioning capability can be implemented is shown. Control stick 54 is movable throughout its range of motion via ball swivel 56, which fits into a socket of housing 58. At the end of control stick 54 is mounted convex dome 60. On the bottom surface of mounted convex dome 60 is gradient 62. Gradient 62 is substantially identical to gradient 22, which has already been described in conjunction with and shown in FIG. 2, and therefore reference should be made thereto for further understanding of gradient 62. The difference between gradient 62 and gradient 22 of FIG. 2 is that gradient 22 is on a flat mouse pad, while gradient 62 is mounted to a spherical convex dome 60.

Gradient 62 still has a plurality of positions uniquely varying in intensity level of a first color on a first axis and uniquely varying in intensity level of a second color on a second axis, no different than gradient 22. Gradient 62 also still is a combination of two separate gradients: a gradient of one color fading from maximum intensity to minimum intensity over one axis, transposed over a gradient of another color fading from maximum intensity to minimum intensity over another, perpendicular axis. In a preferred embodiment, the colors are red and blue.

As control stick 54 is moved throughout its range of motion, it pivots about ball swivel 56 such that convex dome 60, including gradient 62, moves correspondingly. Fixed underneath convex dome 60 are sensor 64, sensor 66 and illuminated lens 68. Thus, as gradient 62 moves, a different uniquely coded position of gradient 62 is positioned over sensors 64 and 66 and illuminated lens 68. Illuminated lens 68 illuminates this position, so that sensor 64 is able to detect the intensity level of the first color and sensor 66 is able to detect the intensity level of the second color. Because each position of gradient 62 has a unique combination of the two colors, each position is uniquely coded. By reading the levels of the two colors in a given position, the sensors are able to determine the exact location of control stick 54 within its range of motion. Because the exact location of two different positions of the control stick is known, the relative position of the joystick pointing device is also determinable. Similar to the mouse pointing device of FIG. 1(b) described above, in one embodiment there is a single sensor (such as a CCD sensor) that combines the functionality of the separate sensors 64 and 66, detecting the intensity level of each of the colors without needing a filter.

The accuracy of the ability of the sensor or sensors to determine the location of control stick 54 is dependent on the number of different uniquely coded positions of gradient 62. The greater the number of uniquely coded positions—i.e., the greater the density of the gradient—the better accuracy at which the sensors are able to determine the location of control stick 54 within its range of motion. Furthermore, the invention is not limited to any particular sensors 64 and 66. However, similar to the sensors of the mouse pointing device, preferably the sensors are optical sensors, such as photo diodes. Each sensor includes a color filter matching the color of the gradient the sensor is meant to detect. Alternatively, as has been described, there is only one sensor without a color filter, such as a CCD sensor. Similarly, the invention is not limited to any particular illuminated lenses 68. Again, however, similar to the illuminated lens of the mouse pointing device, preferably illuminated lens 68 is a light-emitting diode (LEDs), which is one type of light source.

Figure 6:
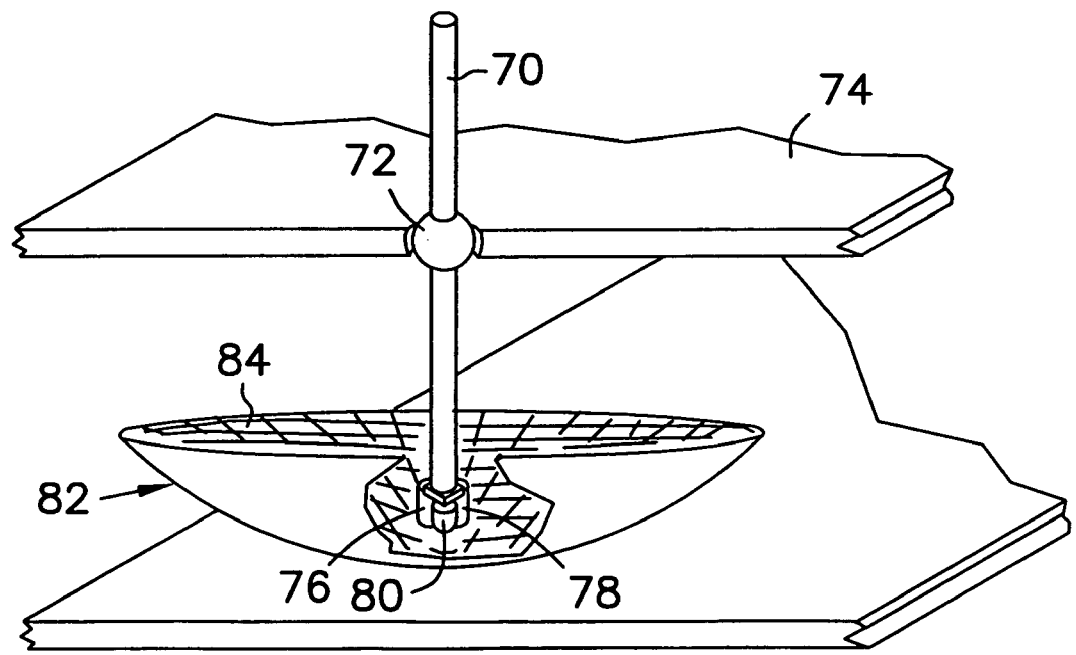
FIG. 6 is a diagram illustrating still another manner by which the joystick pointing device of FIG. 3 is implemented; and, FIG. 7 is a block diagram of a typical computer in conjunction with which a pointing device according to an embodiment of the invention is utilized.

The joystick pointing device implemented as shown in FIG. 5 thus has a movable convex dome with a two-color gradient which is movable over a fixed mechanism including two sensors and an illuminated lens. Another manner by which a joystick pointing device having absolute and relative positioning capability is implemented is shown in FIG. 6. The embodiment of FIG. 6 is similar to that of FIG. 5, but differs in that a movable mechanism including two sensors and an illuminated lens is moved over a fixed convex dome.

Referring now to FIG. 6, control stick 70 is movable throughout its range of motion via ball swivel 72, which fits into a socket of housing 74. At the end of control stick 70 is mounted a mechanism including sensors 76 and 78 and illuminated lens 80. As control stick 70 is moved throughout its range of motion, it pivots about ball swivel 72 such that the mechanism including sensors 76 and 78 and illuminated lens 80 move correspondingly. Fixed underneath this mechanism is concave dome 82, on the top surface of which is gradient 84. Gradient 84 is substantially identical to gradient 22, which has already been described in conjunction with and shown in FIG. 2, and therefore reference should be made thereto for further understanding of gradient 84. The difference between gradient 84 and gradient 22 of FIG. 2 is that gradient 22 was on a flat mouse pad, while gradient 84 is on a spherical concave dome 84.

Gradient 84 still has a plurality of positions uniquely varying in intensity level of a first color on a first axis and uniquely varying in intensity level of a second color on a second axis, no different than gradient 22. Gradient 84 also still is a combination of two separate gradients: a gradient of one color fading from maximum intensity to minimum intensity over one axis, transposed over a gradient of another color fading from maximum intensity to minimum intensity over another, perpendicular axis. In a preferred embodiment, the colors are red and blue.

As the mechanism including the sensors and the illuminated lens moves, a different uniquely coded position of gradient 84 is positioned under sensors 76 and 78 and illuminated lens 80. Illuminated lens 80 illuminates this position, so that sensor 76 is able to detect the intensity level of the first color and sensor 78 is able to detect the intensity level of the second color. Because each position of gradient 84 has a unique combination of the two colors, each position is uniquely coded. By reading the levels of the two colors in a given position, the sensors are able to determine the exact location of control stick 54 within its range of motion. Because the difference between the exact locations of two different positions of the control stick is also determinable, the joystick pointing device is also a relatively positionable pointing device.

The accuracy of the ability of the sensors to determine the location of control stick 70 is dependent on the number of different uniquely coded positions of gradient 84. The greater the number of uniquely coded positions—i.e., the greater the density of the gradient—the better accuracy at which the sensors are able to determine the location of control stick 70 within its range of motion. Furthermore, the invention is not limited to any particular sensors 76 and 78. However, similar to the sensors of the mouse pointing device, preferably the sensors are optical sensors, such as photo diodes. Each sensor includes a color filter matching the color of the gradient the sensor is meant to detect. Furthermore, one sensor, such as a CCD sensor, may combine the functionality of both of sensors 76 and 78, such that it is able to detect the intensity level of each color, without a filter. Similarly, the invention is not limited to any particular illuminated lenses 80. Again, however, similar to the illuminated lens of the mouse pointing device, preferably illuminated lens 80 is a light-emitting diode (LEDs), which is one type of light source.

Figure 7:
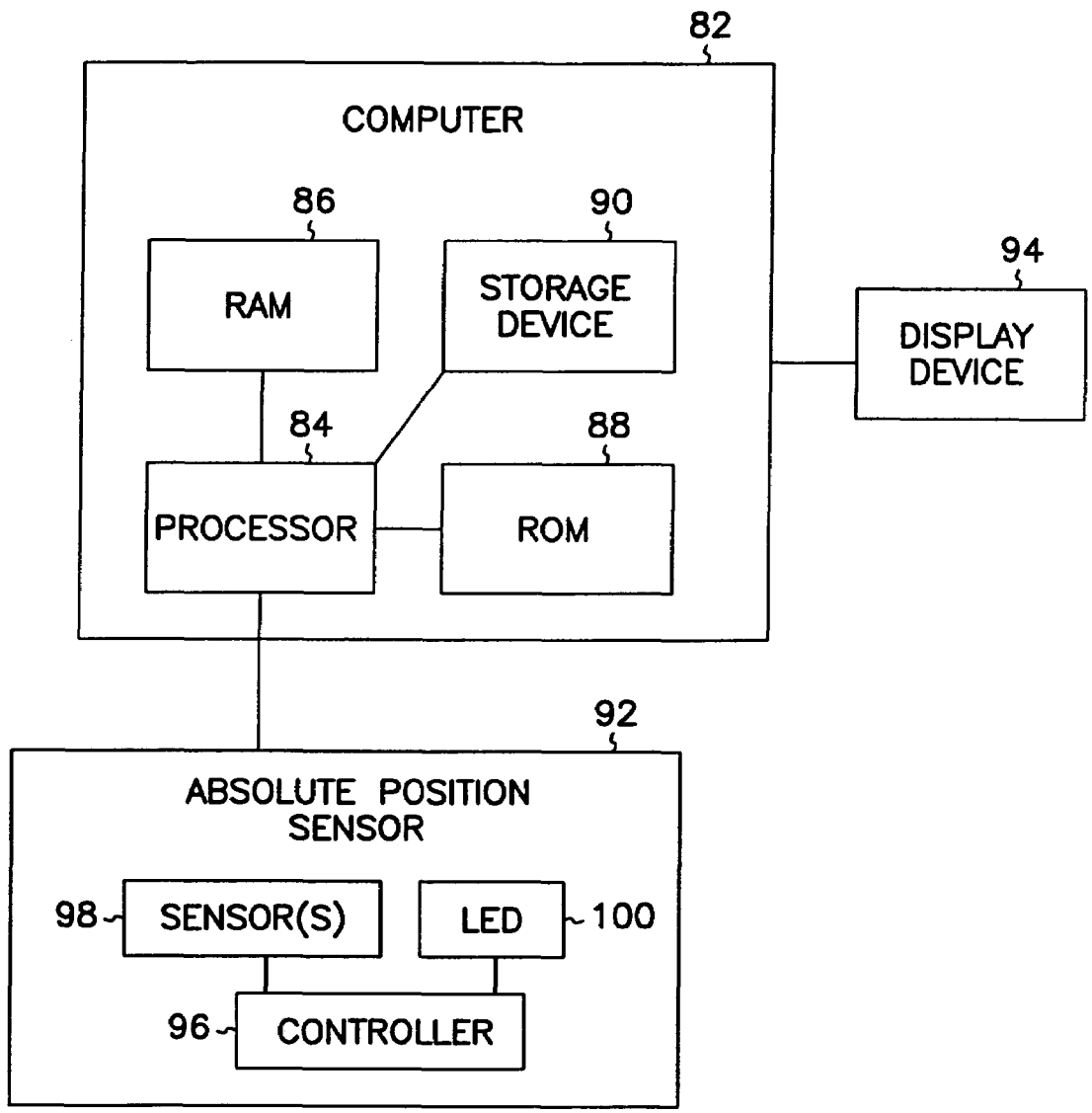

Referring now to FIG. 7, a block diagram of a typical computer in conjunction with which a pointing device according to an embodiment of the invention may be utilized is shown. Computer 82 includes processor 84 (preferably, an Intel Pentium processor), which is operatively coupled to random-access memory (RAM) 86 (preferably, at least sixteen megabytes of RAM), read-only memory (ROM) 88, and one or more storage devices 90, such as a hard disk drive, a floppy disk drive, a CD-ROM drive, or a tape cartridge drive, although the invention is not so limited. Absolute and relative positioning pointing device 92 is operatively coupled to computer 82. Absolute and relative positioning pointing device 92 is any type of absolute and relative positioning pointing device according to the present invention, such as the mouse pointing device and joystick pointing device embodiments described above. Computer 82 is also operatively coupled to display device 94, such as a monitor including a cathode-ray tube (CRT), or a flat-panel display such as a liquid-crystal display (LCD). In other embodiments the display device is integrated into the computer itself.

In a preferred embodiment of the invention, computer 82 is running a version of the Microsoft Windows operating system, such as Microsoft Windows 95 or NT. Computer 82 in this embodiment includes a pointing device driver, which is a software program executed by the processor from a memory or a storage device to interpret information received from touch pad. Pointing device drivers for computers capable of running Microsoft Windows are well known to those of ordinary skill in the art. U.S. patent application Ser. No. 08/724,357, filed Oct. 1, 1996 and titled "Pointing Device with Control for Adjusting Sensitivity," provides a discussion of a mouse driver program. "The Indispensable PC Hardware Book," by Hans-Peter Messmer (2d ed. 1995, ISBN 0-201-87697-3) also provides information regarding pointing device drivers. Both of these references are incorporated herein by reference. In one embodiment, the driver of the invention is a modified pointing device driver such as those known to those skilled in the art to functionality of the inventive pointing device described herein.

Absolute and relative pointing device 92 acts to control a pointer on the screen of display device 94, in the case where computer 82 is running an operating system having a graphical user interface such as Microsoft Windows. For example, in the case of a mouse pointing device according to the present invention, the gradient of the mouse pad corresponds to the screen of the display device. When the mouse is moved to the lower left-hand corner of the gradient, the computer receives this information and correspondingly moves the pointer to the lower left-hand corner of the screen. For further example, in the case of a joystick pointing device according to the present invention, the range of motion of the joystick corresponds to the screen of the display device. When the control stick of the joystick is returned to the center position, the computer receives this information and correspondingly moves the pointer to the center of the screen.

As shown in FIG. 7, absolute and relative pointing device 92 is comprised of three constituent components. Pointing device 92 includes at least one sensor 98 and at least one light-emitting diode (LED) 100, as has been already described in conjunction with the embodiments of the invention shown in FIG. 1(a), FIG. 1(b), FIG. 4, FIG. 5, and FIG. 6. Pointing device 92 also includes controller 96. Controller 96 is preferably an integrated circuit (IC). Controller 96 receives information regarding the color of the area underneath sensor or sensors 98 and LED or LEDs 100, as sensed by the sensor or sensors 98 and as illuminated by the LED or LEDs 100. Controller 96 then sends this information to computer 82, which is preferably received and processed by a pointing device driver of the computer as has been described.

Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. For example, the invention has been shown in relation to a pointing device having a gradient with a color level of varying intensity. However, any surface having uniquely coded positions is amenable to the invention, as those skilled in the art will appreciate. Therefore, it is manifestly intended that this invention be limited only by the following claims and equivalents thereof.

I claim:

1. A computerized system comprising:
a computer having at least a processor and a memory; and,
a mouse pointing device positionable over a surface having a plurality of uniquely coded positions arranged in a gradient substantially covering the surface, the device sensing the coding of the uniquely coded position underneath the mouse and conveying to the computer information relative to the uniquely coded position underneath the mouse.

2. The computerized system of claim 1 wherein the mouse pointing device comprises:
a first sensor positioned under the bottom surface of the dome to detect the intensity level of the first color of the position above the first sensor; and
a second sensor positioned over the bottom surface of the dome to detect the intensity level of the second color of the position above the second sensor.

3. A mouse pointing device comprising a mechanism movable over a surface, the surface having a plurality of uniquely coded positions arranged in a gradient, the mechanism adapted to detect the uniquely coded position underneath the mechanism and to transmit information relative to the uniquely coded position.

4. The mouse pointing device of claim 3 wherein the mechanism includes a first sensor positioned under the bottom surface of the dome to detect the intensity level of the first color of the position above the first sensor; and
a second sensor positioned over the bottom surface of the dome to detect the intensity level of the second color of the position above the second sensor.

5. A joystick pointing device comprising:
a movable control stick;
a first gradient having a plurality of positions uniquely varying in intensity level of a first color, the first gradient operatively coupled to the control stick such that movement of the control stick on a first axis causes corresponding movement of the first gradient;
a fixed first sensor positioned over the first gradient to detect the intensity level of the position underneath the first sensor;
a second gradient having a plurality of positions uniquely varying in intensity level of a second color, the second gradient operatively coupled to the control stick such that movement of the control stick on a second axis causes corresponding movement of the second gradient;

a fixed second sensor positioned over the second gradient to detect the intensity level of the position underneath the second sensor, and:

whereby the intensity level detected by the first sensor and the intensity level detected by the second sensor relate to a unique position of the control stick and such control stick position information is communicated.

6. The joystick pointing device of claim 5, further comprising: a fixed first light source positioned over the first gradient to illuminate the position underneath the first sensor; and, a fixed second light source positioned over the second gradient to illuminate the position underneath the second sensor.

7. A joystick pointing device comprising:

a movable control stick;

a semispherical dome mounted axially to an end of the movable control stick, such that a bottom surface of the dome is convex and has a gradient having a plurality of positions uniquely varying in intensity level of a first color on a first axis and uniquely varying in intensity level of a second color on a second axis;

a first sensor positioned under the bottom surface of the dome to detect the intensity level of the first color of the position above the first sensor;

a second sensor positioned over the bottom surface of the dome to detect the intensity level of the second color of the position above the second sensor; and whereby the intensity level detected by the first sensor and the intensity level detected by the second sensor relate to a unique position of the control stick and such control stick position information is communicated.

8. The joystick pointing device of claim 7, further comprising a light source to illuminate the position above the first sensor and the position above the second sensor.

9. A joystick pointing device comprising: a movable control stick;

a mechanism mounted to an end of the movable control stick; and, a semispherical dome positioned underneath the mechanism, such that a top surface of the dome is concave and has a gradient having a plurality of positions uniquely varying in intensity level of a first color on a first axis and uniquely varying in intensity level of a second color on a second axis, wherein the mechanism comprises:

a first sensor positioned above the top surface of the dome to detect the intensity level of the first color of the position underneath the first sensor;

a second sensor positioned above the top surface of the dome to detect the intensity level of the second color of the position underneath the second sensor; and the intensity level detected by the first sensor and the intensity level detected by the second sensor relate to a unique position of the control stick and such control stick position information is communicated.

10. The joystick pointing device of claim 9, wherein the mechanism further comprises a light source to illuminate the position underneath the first sensor and the position underneath the second sensor.

11. A computerized system comprising: a computer having at least a processor and a memory; and, a joystick including:

a movable control stick a semispherical dome mounted axially to an end of the movable control stick and having a gradient having a plurality of positions uniquely varying in intensity level of a first color on a first axis and uniquely varying in intensity level of a second color on a second axis, a first sensor positioned under the bottom surface of the dome to detect the intensity level of the first color of the position above the first sensor, a second sensor positioned over the bottom surface of the dome to detect the intensity level of the second color of the position above the second sensor; and wherein the intensity level detected by the first sensor and the intensity level detected by the second sensor relate to a unique position of the control stick and such control stick position information is communicated to the computer.

12. A pointing device comprising:

a housing; and, a sensor disposed within the housing and positionable over a first gradient having a first color transposed over a second gradient having a second color, each gradient having a plurality of positions uniquely varying hi intensity level, the sensor detecting the intensity level of the first gradient and the intensity level of the second gradient of the position underneath the sensor, whereby the detected intensity level of the first gradient and the detected intensity level of the second gradient relates to a unique position of the device and information relative to such position is communicated.

13. A pointing device comprising:

a housing;

a first sensor disposed within the housing and positionable over a first gradient having a plurality of positions uniquely varying in intensity level, the first gradient substantially covering a surface, the first sensor detecting the intensity level of the position underneath the first sensor; and, a second sensor disposed within the housing and positionable over a second gradient having a plurality of positions uniquely varying in intensity level, the second gradient substantially covering the surface, the second sensor detecting the intensity level of the position underneath the second sensor, whereby the intensity level detected by the first sensor and the intensity level detected by the second sensor relates to a unique position of the device and information relative to such position is communicated.

14. The pointing device of claim 13, further comprising:

a first light source disposed within the housing to illuminate the position underneath the first sensor; and, a second light source disposed within the housing to illuminate the position underneath the second sensor.

15. The pointing device of claim 14, wherein each of the first and second light sources comprises a light-emitting diode (LED).

16. The pointing device of claim 13, further comprising a light source disposed within the housing to illuminate the position underneath the first sensor and the position underneath the second sensor.

17. The pointing device of claim 13, wherein the first gradient is transposed over the second gradient.

18. The pointing device of claim 13, wherein the position underneath the first sensor is substantially coincident to the position underneath the second sensor.

19. The pointing device of claim 13, wherein each gradient is a color gradient such that the plurality of positions uniquely vary in intensity level of color.

20. The pointing device of claim 19, wherein the first gradient is a color gradient of a first color and the second gradient is a color gradient of a second color.

21. The pointing device of claim 19, wherein the first sensor includes a color filter matching the first gradient and the second sensor includes a color filter matching the second gradient.

22. The pointing device of claim 13, wherein each gradient is a gray-scale gradient such that the plurality of positions uniquely vary in shades of gray.

23. The pointing device of claim 13, wherein the pointing device is a joystick.

24. A pointing device comprising:

a housing;

a first sensor disposed within the housing and positionable over a first surface, the first surface having a plurality of uniquely coded positions arranged in a first gradient, the first gradient substantially covering the surface, the first sensor to detect the uniquely coded position underneath the first sensor;

a second sensor disposed within the housing and positionable over a second surface, the surface having a plurality of uniquely coded positions arranged in a second gradient, the second gradient substantially covering the second surface, the second sensor to detect the uniquely coded position underneath the second sensor; and whereby the position detected by the first sensor and the position detected by the second sensor relates to a unique position of the device and information relative to such position is communicated.

* * * * *